United States Patent
Marino et al.

(10) Patent No.: US 6,563,293 B2
(45) Date of Patent: May 13, 2003

(54) SWITCHING VOLTAGE REGULATOR INCLUDING A POWER MOS SWITCH AND DRIVER CIRCUIT THEREFOR

(75) Inventors: Filippo Marino, Tremestieri Etneo (IT); Salvatore Capici, Tremestieri Etneo (IT)

(73) Assignee: Roelectronics S.r.l., Agrate Brianza (IT)

( * ) Notice: Subject to any disclaimer, the term of this patent is extended or adjusted under 35 U.S.C. 154(b) by 0 days.

(21) Appl. No.: 09/901,454

(22) Filed: Jul. 9, 2001

(65) Prior Publication Data

US 2002/0021114 A1 Feb. 21, 2002

(30) Foreign Application Priority Data

Jul. 10, 2000 (EP) .............................. 00830481

(51) Int. Cl.[7] ................................................ G05F 1/40
(52) U.S. Cl. ...................................................... 323/272
(58) Field of Search ................................. 323/269, 272, 323/312, 350, 282; 327/408, 489, 541, 542

(56) References Cited

U.S. PATENT DOCUMENTS

| | | | |
|---|---|---|---|
| 4,616,142 A | | 10/1986 | Upadhyay et al. ........... 307/242 |
| 4,695,935 A | * | 9/1987 | Oen et al. ...................... 363/71 |
| 5,012,178 A | * | 4/1991 | Weiss et al. .................. 323/269 |
| 5,500,623 A | * | 3/1996 | Kimura ....................... 330/252 |
| 5,949,158 A | | 9/1999 | Schulz ........................ 307/127 |
| 6,084,790 A | * | 7/2000 | Wong .............................. 363/71 |
| 6,222,353 B1 | * | 4/2001 | Pattamatta et al. .......... 323/269 |
| 6,229,289 B1 | * | 5/2001 | Piovaccari et al. .......... 323/268 |
| 6,249,111 B1 | * | 6/2001 | Nguyen ....................... 323/282 |
| 6,316,956 B1 | * | 11/2001 | Oglesbee ....................... 326/10 |
| 6,362,606 B1 | * | 3/2002 | Dupuis et al. ............... 323/272 |
| 6,472,854 B2 | * | 10/2002 | Ootani ......................... 323/272 |

FOREIGN PATENT DOCUMENTS

EP 0581016 2/1994 .......... H03K/17/12

* cited by examiner

*Primary Examiner*—Michael Sherry
*Assistant Examiner*—Gary L. Laxton
(74) *Attorney, Agent, or Firm*—Allen, Dyer, Doppelt, Milbrath & Gilchrist, P.A.; Lisa K. Jorgenson

(57) ABSTRACT

A switching voltage regulator includes a metal oxide semiconductor (MOS) power switch and driver circuit therefor. The MOS power switch may include a plurality of n power transistors each connected in parallel with one other. In particular, the first of the plurality of power transistors may have a larger size than the other power transistors. More specifically, the respective sizes of the individual power transistors may scale down from one to the next. In this way, an equivalent size of the power switch is greatly reduced with respect to prior art switches in that the first and largest transistor may be readily turned off. This may be carried out without substantially affecting the delivered current, which continues to be supplied by the remaining transistors. Further, a transconductance of the power switch may decrease as the power transistors are turned off in order from the first through the nth power transistors.

28 Claims, 2 Drawing Sheets

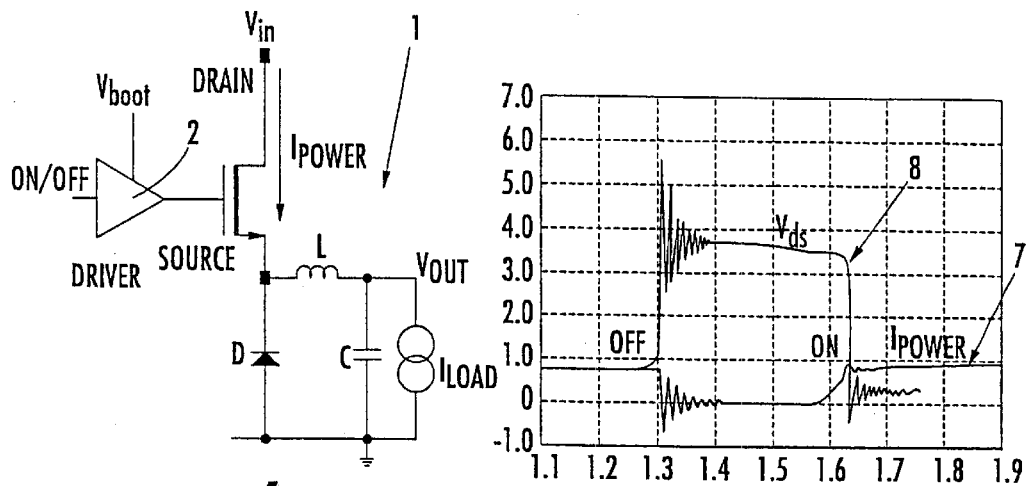
FIG. 1.
(PRIOR ART)
FIG. 1A.
(PRIOR ART)
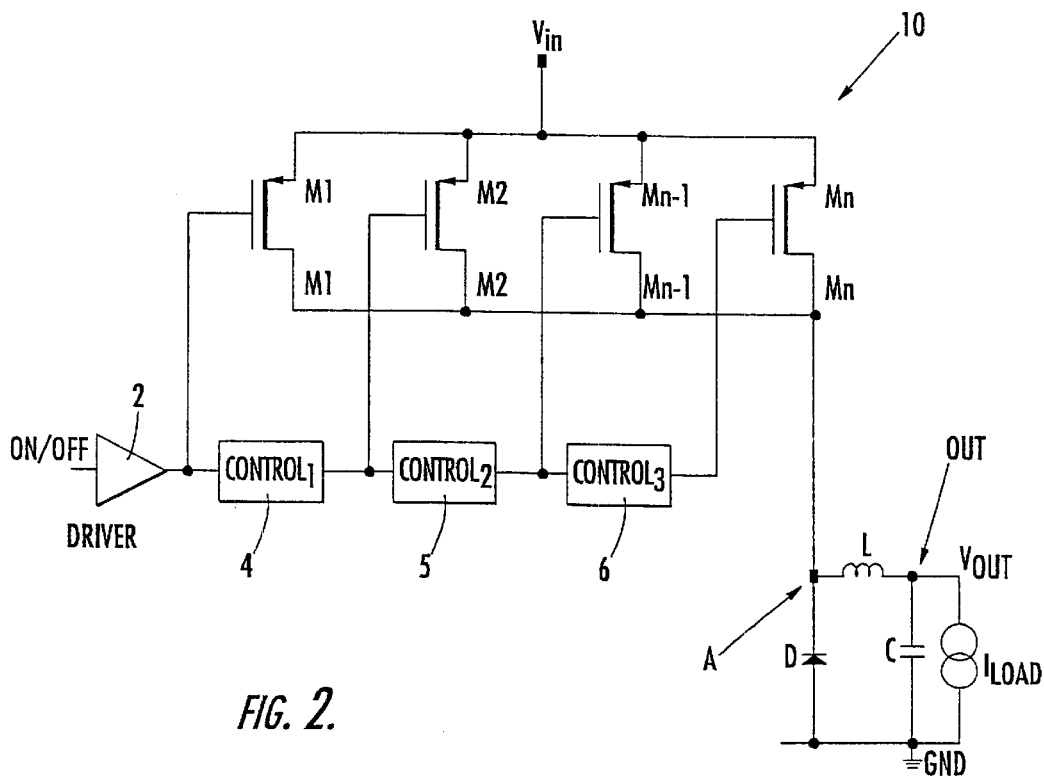
FIG. 2.

SWITCHING VOLTAGE REGULATOR INCLUDING A POWER MOS SWITCH AND DRIVER CIRCUIT THEREFOR

FIELD OF THE INVENTION

The present invention relates to the field of electronic circuits, and, more particularly, to switching voltage regulators.

BACKGROUND OF THE INVENTION

The present invention corresponds to the development of a new family of devices fabricated with bipolar-CMOS-DMOS-VDMOS (BCDV) technology, where CMOS stands for complementary metal oxide semiconductor, DMOS stands for double-diffused MOS, and VDMOS stands for vertical DMOS. More specifically, the present invention relates to a switching voltage regulator of the step-down type which has a plurality of output currents, and which may be associated with a current loop for a battery charger. The following description is made with reference to this technical field for clarity of explanation, but other applications known to those of skill in the art may also be possible.

Switching voltage regulators are widely utilized in many applications because of their efficiency and precision. These regulators include, as their basic components, a transistor-based power switch, a loop-back diode, an LC output filter, and an optional current sensor for the battery charger. To be competitive, new-generation regulators must have ever higher switching frequencies so that ever smaller external components can be used to fill demands for both reduced circuit space and enhanced cost efficiency. In particular, these regulators preferably have their external components reduced to a minimum.

The frequency increase implies a limited regulator efficiency mainly because of the switching losses of the power switch. Accordingly, the most critical aspect the regulator performs is in its circuit portion, which is devoted to driving the power switch, since switching losses are dependent on that portion.

One of the problems encountered by the driver circuits of such power switches is that of achieving a total reduction of both static and dynamic consumption. Further, it may also be problematic to control the current edges to minimize electromagnetic disturbance and to avoid spurious operation due to the activation of current limiters at power-on.

Another equally important problem is the power switch stressing caused by the speed of the power on/off edges, as well as the presence of parasitic RLC circuit portions in the load and the device itself. In a specific application, bonding wires and board conduction paths would be connected in series with the source and the drain of the power switch. From physics, it is known that an inductor being traversed by a current I would resist a sharp variation in the current by presenting an overvoltage at its peaks. This is proportional to the inductance L value and the rate of variation of the current, according to the relation $DV=L(dI/dt)$.

In switching voltage regulators, the current flowing through the power switch exhibits variations of several hundreds Amperes per microsecond, both at power-on and power-off phases. The parasitic inductance L of bonding wires may instead be as high as a few tens of nH. It follows that, with the current edges being so fast, and because of the values of the parasitic inductance, overvoltages of even 10V may occur at the source and the drain of the power switch. If the regulator operates at the highest allowable input voltage, these overvoltages, by adding together with one another, can push the power switch transistor outside its safe operating area (SOA), possibly damaging it by voltage breakdown. This phenomenon is likely to occur when either an N-channel or a P-channel MOS power transistor is used.

By way of example, a prior art switching voltage regulator 1 which includes an N-channel MOS power transistor is shown in FIG. 1. The driver circuit 2 of the regulator 1 has been optimized to minimize the effect of the time taken to go through the loop-back diode, in accordance with the teachings of U.S. Pat. No. 5,883,505, also assigned to the assignee of the present invention. The power-on edge is optimized essentially by having the gate of the power switch slowly charged until the loop-back on the diode D is over. This gate is then charged very fast to minimize switching losses.

In this type of regulator, the critical switching edge is still the power-off edge. Otherwise, to control the current edge at power-off, it would be necessary to proceed in exactly the opposite way to the power-on situation. In fact, to slow down the current edge, the power transistor gate would have to be discharged very slowly, and this is unfortunately in conflict with consumption minimization. It also presents practical difficulties because the power transistor is very large (i.e., W of a few tens of mm). Thus, when operating close to the threshold value, a few mV variation of the voltage Vgs between the gate and source terminals is enough to produce large variations of the drain current Ipower. The drive voltage of the power transistor should therefore be controlled in a very precise manner (within one mV).

In other words, to handle the current edge at power-off and, at the same time, to achieve optimized efficiency, Vgs of the power transistor should be quickly decreased until it nears the threshold value. It should then be slowly and accurately varied within one mV. Producing a suitable circuit to fill this demand is practically impossible with current BCD technologies. In fact, components would be needed which can respond within a very short time (i.e., a few nanoseconds). Even if such components could be made available, it would be necessary to have the voltage at the gate terminal varied very slowly and with a very high precision (a few mV variation can result in a several Ampere variation occurring in the current).

Prior art approaches are unable to meet both of the aforementioned requirements both at power-on and at power-off. The current practice is to try to address the above problem by driving the gate terminal of the power transistor very slowly during the first power-on phase, when this would be unnecessary. Respective patterns 7, 8 of the current Ipower and of the voltage drop Vds for the circuit of FIG. 1 are shown in FIG. 1A at the power-on and power-off stages thereof. As may be seen, this prior art approach results in increased switching losses and, hence, poorer overall efficiency of the regulator.

SUMMARY OF THE INVENTION

It is an object of the invention to provide a driver circuit for a power transistor which exhibits appropriate structural and functional features to afford reliable handling of the overvoltage effects. Such effects may be caused by the speed of the current edges during the switching, for example. Thus, the driver circuit alleviates the aforementioned drawbacks of the prior art. In essence, the driver circuit of present invention provides the same speed of response at the power-on as at the power-off edges, while at the same time minimizing consumption and reducing stressing the power transistor gate.

It is another object of the invention to provide a driver circuit for a power transistor where the driver circuit provides the power switch using a plurality of transistors connected to each other in parallel and having scaled dimensions so that they can be independently driven.

These and other objects, features, and advantages are provided by a switching voltage regulator including a metal oxide semiconductor (MOS) power switch and a driver circuit therefor. The MOS power switch may include a plurality of power transistors each connected in parallel to one another and each having a respective size. Further, the size of a first one of the power transistors may be greater than the respective sizes of the other power transistors.

BRIEF DESCRIPTION OF THE DRAWINGS

The features and advantages of a regulator according to the present invention will be apparent from the description of an embodiment thereof, given by way of non-limitative example, with reference to the accompanying drawings.

FIG. 1 is a schematic diagram of a switching voltage regulator according to the prior art.

FIG. 1A is a graph illustrating, as a function of time, the voltage and the current signals present in the regulator of FIG. 1.

FIG. 2 is a schematic diagram of a switching voltage regulator according to the present invention.

DETAILED DESCRIPTION OF THE PREFERRED EMBODIMENTS

Figure 3:
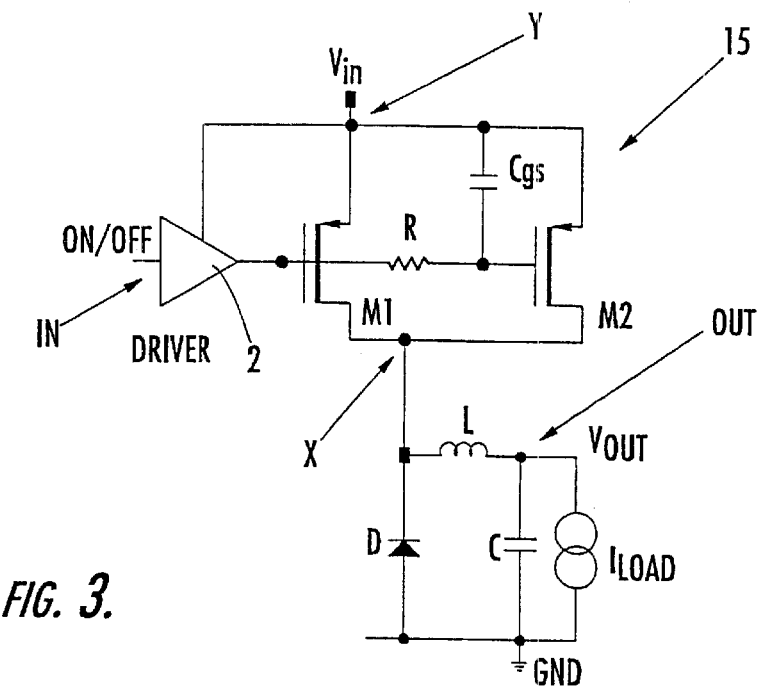
FIG. 3 is a schematic diagram of a particular embodiment of the regulator of FIG. 2.

With reference to the drawings, and particularly to FIG. 2, a switching voltage regulator 10 according to the invention is now described. The regulator 10 is connected between a first Vin supply voltage reference and a second ground reference, and includes a power switch formed by a MOS-type power transistor driven by a driver circuit 2. The power switch is intended to drive an electric load on a node OUT, and is associated with a current loop illustrated by a circuit LC having a loop-back diode D associated therewith.

More particularly, the power switch includes a plurality of power transistors M1, M2, Mn-1, Mn which are connected in parallel to each other. Essentially, the power switch of the regulator has been split into a plurality of n switches obtained by corresponding power transistors M1, M2, . . . , Mn which are connected in parallel to each other and are smaller than the single power transistor of the prior art. More particularly, if Wtot is the width required to obtain the desired internal resistance Ron at power-on conditions, the dimensions Wi of the individual power transistors M1, M2, . . . , Mn are preferably scaled down such that $Wtot = \Sigma_i^n Wi,$ and $W1 >> W2 \geq W3 \ldots \geq Wn$.

The gate terminals of each of the n transistors M1, M2, . . . , Mn are driven by a single driver circuit 2 such that the gate terminal of the largest transistor, M1, is discharged very fast. Also, the gate terminals of the other transistors, M2, . . . , Mn-1, Mn, which are of decreasing size, are suitably driven by control circuit portions 4, 5, 6 . . . , which are connected between the output of the driver circuit 2 and each respective gate terminal of the corresponding transistor.

By using these control circuit portions 4, 5, 6 . . . , the size of the power transistors to be driven are allowed to decrease gradually, while also controlling the leading and trailing edges of the current. In this way, the equivalent dimensional parameter W of the power switch is greatly reduced because, at power-off, the first transistor M1 with the largest value W1 is readily turned off. All this occurs without affecting the delivered current, since it continues to be delivered by the remaining transistors M2, . . . , Mn.

Also, with a reduced W, it becomes possible to control, in a more precise way and with a wider margin, the edge of the current delivered from the plurality of transistors M1, . . . , Mn. This is particularly so when approaching the tripping threshold of the whole set of transistors. In fact, the control no longer requires that just a few millivolts be monitored, as in the prior art.

The control circuit portions may be implemented, for example, with appropriate delay blocks. Furthermore, it would be perfectly possible to separately drive the n gate terminals and/or move the control of such terminals to a location upstream of the driver circuit 2. Compared to the prior art approaches, with the structure of the present invention the transconductance of the power switch is modified since it decreases as the transistors are turned off, starting with M1. Further, the voltage drop Vgs may be varied faster to obtain the same current edge. This minimizes consumption and optimizes the entire system efficiency.

The present invention overcomes the problems mentioned with reference to the prior art, and it may be applied to N-channel as well as to P-channel topologies. The schematic diagram shown in FIG. 2 relates to a P-channel topology, but those of skill in the art will appreciate how to adapt the invention for an N-channel topology.

Referring to the example shown in FIG. 3, a particular embodiment 15 of the inventive regulator will now be described. In this example, the power transistor has been split for clarity of illustration into two transistors M1, M2 only. These transistors are connected in parallel to each other between the nodes Y and X, and their dimensions W1 and W2 are in agreement with the following relations: $W_{M1} = n \cdot W_{M2}$; and $W_{tot} = W_{M1} + W_{M2}$.

The control circuit portion is formed essentially with a delay block which is implemented by an RC network. The RC network includes a resistor R connected between the gate terminals of the transistors M1, M2, and a parasitic capacitor Cgs connected between the gate and source terminals of the second power transistor M2. In this way, the larger transistor, M1, is turned off very rapidly while the second transistor M2 keeps delivering the required current to the output circuit LC until the loop-back diode begins conducting. The Vgs voltage drop of the second transistor M2 is slowly decreased (according to an exponential function with a time constant t=RCgs) in these conditions, since the transconductance of the transistor M2 is small. Also, by an appropriate selection of n and R, the edge of the current (about 50 A/ms) delivered from the transistor M2 can be effectively controlled.

Figure 4:
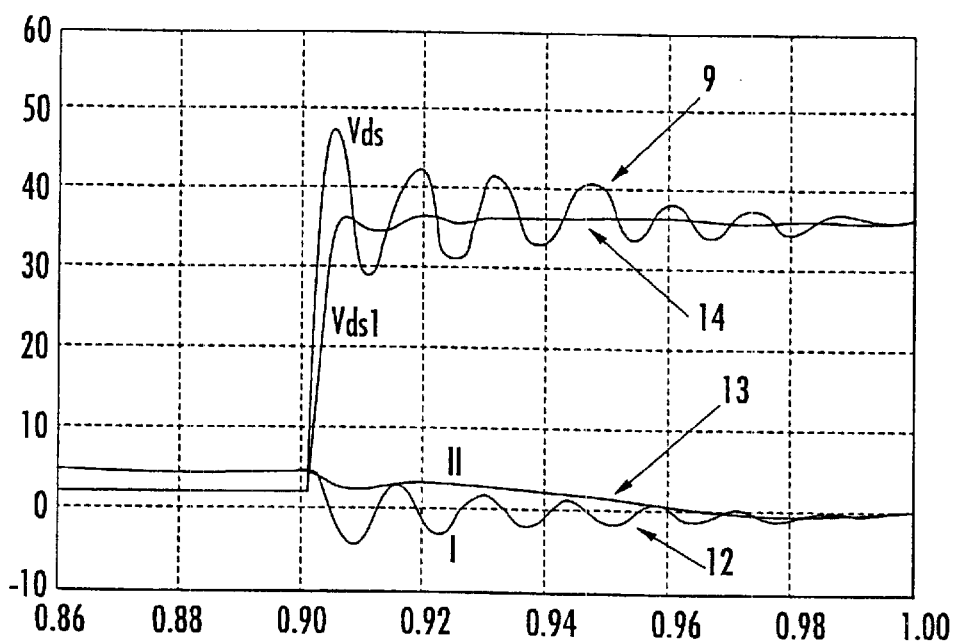
FIG. 4 is a graph illustrating, as a function of time, the voltage and the current signals present in the regulator of FIG. 2 as compared with the signals of the regulator of FIG. 1.

Turning now to FIG. 4, a comparison may be seen between the current edges I, I1 and the Vds voltage at the leading edges for a power switch including a single transistor in accordance with the prior art (curves 12 and 9) and for the power switch of the present invention including the plurality of parallel power transistors (curves 13 and 14). The driver circuit 2 is the same in both cases. It can be easily seen that, with the structure of the invention, the current power-off edge is controlled such that the drain-source voltage of the power switch does not exceed its SOA limit (40V in the example). To achieve the same results by merely slowing down the driving, as is done in the prior art, conduction losses would occur, which would detract significantly from the overall efficiency of the regulator.

That which is claimed is:

1. A switching voltage regulator comprising:
   a metal oxide semiconductor (MOS) power switch comprising a plurality of power transistors each connected in parallel to one another and each having a respective size, the size of a first one of said power transistors being greater than a respective size of at least one other power transistor of said plurality of power transistors; and
   a driver circuit for said MOS power switch having an output connected to a control terminal of said first power transistor; and
   a respective control circuit for each power transistor of said plurality of power transistors after said first power transistor, each control circuit being connected between the output of said driver circuit and a control terminal of its respective power transistor.

2. The switching voltage regulator according to claim 1, wherein each control circuit comprises a delay circuit.

3. The switching voltage regulator according to claim 1, wherein each power transistor has a transconductance, and wherein said plurality of power transistors are arranged in order from a highest transconductance to a lowest transconductance.

4. The switching voltage regulator according to claim 1, wherein said plurality of power transistors are all of a same conductivity type.

5. The switching voltage regulator according to claim 1, wherein the size of each power transistor is greater than or equal to the size of a next one of said power transistors from said first power transistor to an nth one of said power transistors.

6. The switching voltage regulator according to claim 5, wherein the respective sizes of each of said plurality of power transistors are scaled down from said first power transistor to said nth power transistor such that $$Wtot=\Sigma_i^n Wi,$$

where Wtot is a size required to provide a predetermined internal resistance of said MOS power switch during a power-on condition, and where Wi is the size of each power transistor.

7. The switching voltage regulator according to claim 1 wherein said plurality of power transistors comprises said first power transistor and a second power transistor, and wherein the size of said first power transistor is a multiple of the size of said second power transistor.

8. The switching voltage regulator according to claim 7 wherein said first and second power transistors each have a control terminal; and wherein said voltage regulator further comprises a resistor-capacitor delay circuit connected across the control terminals of said first and second power transistors.

9. A switching voltage regulator comprising:
   a metal oxide semiconductor (MOS) power switch comprising a plurality of power transistors of a same conductivity type each connected in parallel to one another and ech having a respective size, the size of each power transistor being greater than or equal to the size of a next one of said power transistors from a first one of said power transistors to an nth one of said power transistors; and
   a driver circuit for said MOS power switch having an output connected to a control terminal of said first power transistors; and
   a respective control circuit for each power transistor of said plurality of power transistors after said first power transistor, each control circuit being connected between the output of said driver circuit and a control terminal of its respective power transistor.

10. The switching voltage regulator according to claim 9 wherein the respective sizes of each of said plurality of power transistors are scaled down from said first power transistor to said nth power transistor such that $$Wtot=\Sigma_i^n Wi,$$

where Wtot is a size required to provide a predetermined internal resistance of said MOS power switch during a power-on condition, and where Wi is the size of each power transistor.

11. The switching voltage regulator according to claim 9 wherein each control circuit comprises a delay circuit.

12. The switching voltage regulator according to claim 9 wherein each power transistor has a transconductance, and wherein said plurality of power transistors are arranged in order from a highest transconductance to a lowest transconductance.

13. The switching voltage regulator according to claim 9 wherein said plurality of power transistors comprises said first power transistor and a second power transistor, and wherein the size of said first power transistor is a multiple of the size of said second power transistor.

14. The switching voltage regulator according to claim 13 wherein said first and second power transistors each have a control terminal; and wherein said voltage regulator further comprises a resistor-capacitor delay circuit connected across the control terminals of said first and second power transistors.

15. A switching voltage regulator comprising:
   a metal oxide semiconductor (MOS) power switch comprising a plurality of power transistors each connected in parallel to one another and each having a respective transconductance, said plurality of power transistors being arranged in order from a highest transconductance to a lowest transconductance; and
   a driver circuit for said MOS power switch having an output connected to a control terminal of a first one of said plurality of power transistors; and
   a respective control circuit for each power transistor of said plurality of power transistors after said first power transistor, each control circuit being connected between the output of said driver circuit and a control terminal of its respective power transistor.

16. The switching voltage regulator according to claim 15 wherein each of said power transistors has a respective size; and wherein the size of each power transistor is greater than or equal to the size of a next one of said power transistors from the first one of said power transistors to an nth one of said power transistors.

17. The switching voltage regulator according to claim 16 wherein the respective sizes of each of said plurality of power transistors are scaled down from said first power transistor to said nth power transistor such that $$Wtot=\Sigma_i^n Wi,$$

where Wtot is a size required to provide a predetermined internal resistance of said MOS power switch during a power-on condition, and where Wi is the size of each power transistor.

18. The switching voltage regulator according to claim 15 wherein each control circuit comprises a delay circuit.

19. The switching voltage regulator according to claim 15 wherein said plurality of power transistors are all of a same conductivity type.

20. The switching voltage regulator according to claim 15 wherein said plurality of power transistors comprises first and second power transistors, and wherein the size of said first power transistor is a multiple of the size of said second power transistor.

21. The switching voltage regulator according to claim 20 wherein said first and second power transistors each have a control terminal; and wherein said voltage regulator further comprises a resistor-capacitor delay circuit connected across the control terminals of said first and second power transistors.

22. A method for making a switching voltage regulator comprising:

connecting a plurality of power transistors in parallel to one another to form a metal oxide semiconductor (MOS) power switch, each power transistor having a respective size, and the size of a first one of the power transistors being greater than a respective size of at least one other power transistor of said plurality of power transistors; and connecting an output of a driver circuit to a control terminal of the first power transistor of the MOS power switch; and connecting a respective control circuit between the output of the driver circuit and a control terminal of each power transistor of the plurality of power transistors after the first power transistor.

23. The method according to claim 22 wherein each power transistor has a transconductance, and wherein the plurality of power transistors are arranged in order from a highest transconductance to a lowest transconductance.

24. The method according to claim 22 wherein the size of each power transistor is greater than or equal to the size of a next one of the power transistors from the first power transistor to an nth one of the power transistors.

25. The method according to claim 24 wherein the respective sizes of each of the plurality of power transistors are scaled down from the first power transistor to the nth power transistor such that $$Wtot=\Sigma_i^n Wi,$$

where Wtot is a size required to provide a predetermined internal resistance of the MOS power switch during a power-on condition, and where Wi is the size of each power transistor.

26. A method for making a switching voltage regulator comprising:

connecting a plurality of power transistors in parallel to one another to form a metal oxide semiconductor (MOS) power switch, each power transistor having a respective transconductance, and the plurality of power transistors being arranged in order from a highest transconductance to a lowest transconductance; and connecting an output of a driver circuit to a control terminal of a first power transistor of the MOS power switch; and connecting a respective control circuit between the output of the driver circuit and a control terminal of each power transistor of the plurality of power transistors after the first power transistor.

27. The method according to claim 26 wherein each of the power transistors has a respective size; and wherein the size of each power transistor is greater than or equal to the size of a next one of the power transistors from the first one of the power transistors to an nth one of the power transistors.

28. The method according to claim 27 wherein the respective sizes of each of the plurality of power transistors are scaled down from the first power transistor to the nth power transistor such that $$Wtot=\Sigma_i^n Wi,$$

where Wtot is a size required to provide a predetermined internal resistance of the MOS power switch during a power-on condition, and where Wi is the size of each power transistor.

* * * * *